US012732589B2

(12) United States Patent
Raghunath et al.

(10) Patent No.: US 12,732,589 B2
(45) Date of Patent: Sep. 8, 2026

(54) DYNAMIC BINNING PASSTHROUGH CONTENT

(71) Applicant: Apple Inc., Cupertino, CA (US)

(72) Inventors: Kaushik Raghunath, Pleasanton, CA (US); Venu M. Duggineni, San Jose, CA (US)

(73) Assignee: Apple Inc., Cupertino, CA (US)

( * ) Notice: Subject to any disclaimer, the term of this patent is extended or adjusted under 35 U.S.C. 154(b) by 264 days.

(21) Appl. No.: 18/110,365

(22) Filed: Feb. 15, 2023

(65) Prior Publication Data

US 2023/0300285 A1 Sep. 21, 2023

Related U.S. Application Data

(60) Provisional application No. 63/321,545, filed on Mar. 18, 2022.

(51) Int. Cl.

| | |
|---|---|
| ***H04N 5/265*** | (2006.01) |
| ***G06F 3/01*** | (2006.01) |
| ***G06T 3/40*** | (2024.01) |
| ***G06T 11/00*** | (2026.01) |
| ***H04N 23/667*** | (2023.01) |
| ***H04N 23/80*** | (2023.01) |
| ***H04N 25/46*** | (2023.01) |

(52) U.S. Cl.

CPC ............ *H04N 5/265* (2013.01); *G06F 3/013* (2013.01); *G06T 3/40* (2013.01); *H04N 23/667* (2023.01); *H04N 23/80* (2023.01); *H04N 25/46* (2023.01); *G06T 11/00* (2013.01)

(58) Field of Classification Search

None

See application file for complete search history.

(56) References Cited

U.S. PATENT DOCUMENTS

| | | | |
|---|---|---|---|
| 11,190,714 B2 | 11/2021 | Nakata | |
| 12,057,089 B2 | 8/2024 | Hazra et al. | |
| 2010/0283843 A1 | 11/2010 | Cai | |
| 2013/0070109 A1 | 3/2013 | Gove et al. | |
| 2017/0287112 A1 | 10/2017 | Stafford et al. | |
| 2018/0220068 A1 | 8/2018 | Guenter | |
| 2019/0331919 A1* | 10/2019 | Huo | H04N 23/55 |
| 2019/0355332 A1 | 11/2019 | Knez et al. | |
| 2020/0090396 A1* | 3/2020 | Holmes | G06T 11/40 |

(Continued)

FOREIGN PATENT DOCUMENTS

| | | |
|---|---|---|
| EP | 1102323 A1 | 5/2001 |
| EP | 1467410 A2 | 10/2004 |

(Continued)

OTHER PUBLICATIONS

International Search Report and Written Opinion from PCT/US2023/014662, dated May 17, 2023, 14 pages.

(Continued)

*Primary Examiner* — Jeffrey J Chow

(74) *Attorney, Agent, or Firm* — BAKERHOSTETLER

(57) ABSTRACT

A method is provided that includes determining a gaze position of a user relative to mixed-reality content displayed in a first frame, setting a binning mode for a first camera based on the determined gaze position, and capturing, using the first camera, passthrough content for a second frame at a resolution determined by the binning mode.

20 Claims, 4 Drawing Sheets

(56) References Cited

U.S. PATENT DOCUMENTS

| | | | | |
|---|---|---|---|---|
| 2020/0326777 | A1* | 10/2020 | Shoushtari | G02B 27/0093 |
| 2021/0081040 | A1* | 3/2021 | Sengelaub | G06T 7/20 |
| 2021/0166341 | A1* | 6/2021 | Bastani | G06T 11/00 |
| 2022/0201236 | A1 | 6/2022 | Gao et al. | |
| 2023/0300285 | A1 | 9/2023 | Raghunath et al. | |
| 2024/0007771 | A1 | 1/2024 | Berkovich et al. | |
| 2024/0029210 | A1 | 1/2024 | Pope | |
| 2024/0114266 | A1 | 4/2024 | Yang | |
| 2024/0267627 | A1* | 8/2024 | Katz | G06V 10/25 |

FOREIGN PATENT DOCUMENTS

| | | |
|---|---|---|
| KR | 2022-0020899 | 2/2022 |
| WO | WO 2023/163799 A1 | 8/2023 |

OTHER PUBLICATIONS

International Search Report and Written Opinion from PCT/US2025/024789, dated Jul. 1, 2025, 17 pages.
European Patent Application No. 23713001.8, Examination Report dated Feb. 20, 2026, 6 pages.
Korean Patent Application No. 10-2024-7031006, Office Action dated Mar. 26, 2026, 12 pages, with English translation.

* cited by examiner

DYNAMIC BINNING PASSTHROUGH CONTENT

CROSS REFERENCE TO RELATED APPLICATIONS

This application claims the benefit of priority to U.S. Provisional Patent Application No. 63/321,545, entitled, "Dynamic Binning Passthrough Content", filed on Mar. 18, 2022, the disclosure of which is hereby incorporated herein in its entirety.

TECHNICAL FIELD

The present description relates generally to electronic devices including, for example, electronic devices used for presenting mixed reality environments.

BACKGROUND

A mixed reality environment may refer to a simulated environment that is designed to incorporate sensory inputs from a physical environment. Mixed reality environments may be generated by blending rendered virtual content with a passthrough content stream captured using outward facing cameras.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A mixed reality environment may refer to a simulated environment that is designed to incorporate sensory inputs from a physical environment. Mixed reality environments may be generated by blending rendered virtual content with a passthrough content stream captured using outward facing cameras. The passthrough content may be captured at a resolution and frequency the significantly impacts the power consumption of the electronic device processing and presenting the mixed reality environment.

Eye tracking may be used to determine a gaze position of a user with respect to a mixed reality environment being displayed to the user. The gaze position may be used for dynamic foveation where the virtual content is rendered at the highest resolution around the gaze position and tapers off as you move away from the gaze position. The subject technology uses the gaze position together with the location of the virtual content in the mixed reality environment to control the resolution at which the passthrough content is captured by the outward facing cameras. For example, when the gaze position of a user is occupied within the mixed reality environment by rendered content, the resolution of the passthrough content can be reduced while having little to no impact on the user experience viewing the mixed reality environment. Reducing the resolution of the passthrough content reduces power consumption of the camera as well as the processing pipeline that processes the images captured by the camera. For power-constrained electronic devices, such as portable electronic devices that rely on battery power, the power savings can extend the use period of the electronic device and/or allow additional processing and algorithms to be run to enhance the mixed reality experience.

Figure 1:
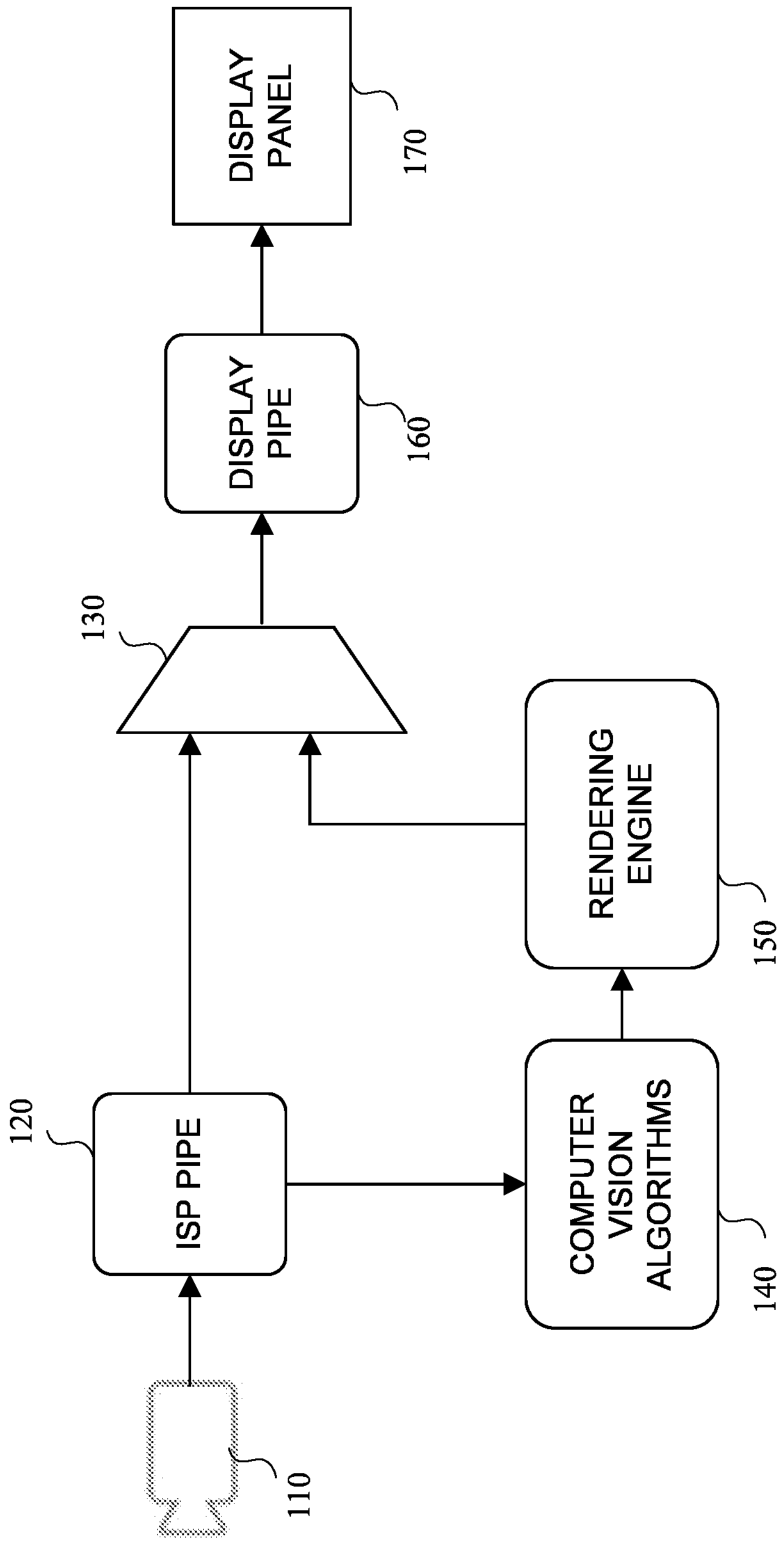
FIG. 1 is a block diagram illustrating the flow of data between components of an electronic device configured to present a mixed reality experience according to aspects of the subject technology.

FIG. 1 is a block diagram illustrating the flow of data between components of an electronic device configured to present a mixed-reality experience according to aspects of the subject technology. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As illustrated in FIG. 1, the electronic device includes camera 110, image signal processing (ISP) pipe 120, blending module 130, computer vision algorithms 140, rendering engine 150, display pipe 160, and display panel 170. The electronic device may be a smartphone, a tablet, a head-mountable device (HMD), etc. Camera 110 represents a camera configured to capture passthrough content for presentation in a mixed-reality experience. Camera 110 is forward facing, meaning camera 110 is oriented to face in the same direction as a user of the electronic device is expected to be facing. Passthrough content is an image or frame of the physical environment in which the user and the electronic device are present. Camera 110 may be configured to provide a stream of frames at a configurable frame rate.

ISP pipe 120 represents hardware, or a combination of hardware and software, configured to read out image frames from camera 110 and provide the image frames to blending module 130. ISP pipe 120 also is configured to provide the image frames to computer vision algorithms 140. Computer vision algorithms 140 represents software, hardware, or a combination of software and hardware configured to process image frames for computer vision tasks such as determining scene geometry, object identification, object tracking, etc. Computer vision algorithms 140 may not need the image frames to be in the highest resolution available from camera 110 to perform the computer vision tasks. In this scenario, ISP pipe 120 may be configured to downscale the resolution of the image frames received from camera 110 to a resolution preferred by computer vision algorithms 140. Computer vision algorithms 140 also may provide the functionality of a gaze position module, described in more detail below.

Rendering engine 150 represents software, hardware, or a combination of software and hardware configured to render virtual content for presentation in the mixed-reality experience. Rendering engine 150 is configured to provide frames of virtual content to blending module 130. Blending module 130 represents software, hardware, or a combination of software and hardware configured to blend the frames of virtual content received from rendering engine 150 with the image frames of the physical environment provided to blending module 130 by ISP pipe 120. Blending may comprise overlaying the rendered virtual content on the image frames of the physical environment. The position, size, and orientation of the rendered virtual content may be rendered by rendering engine 150 based on scene information determined by computer vision algorithms 140. Display pipe 160 represents hardware, or a combination of hardware and software, configured to receive the blended frames from blending module 130 and provide the blended frame data to display panel 170 for presentation of the mixed-reality environment to the user of the electronic device.

Camera 110 may represent multiple cameras configured to capture image frames of the physical environment of the user for presentation on multiple respective display panels 170. For example, one camera may be configured to capture image frames for presentation on a display panel arranged to display mixed-reality content to one of a user's eyes, and a second camera may be configured to capture image frames for presentation on a second display panel arranged to display mixed-reality content to the other eye of the user. There also may be multiple instances of the components in the pipeline between camera 110 and display panel 170 described above for generation of the respective mixed-reality frames presented on the respective display panels.

Figure 2:
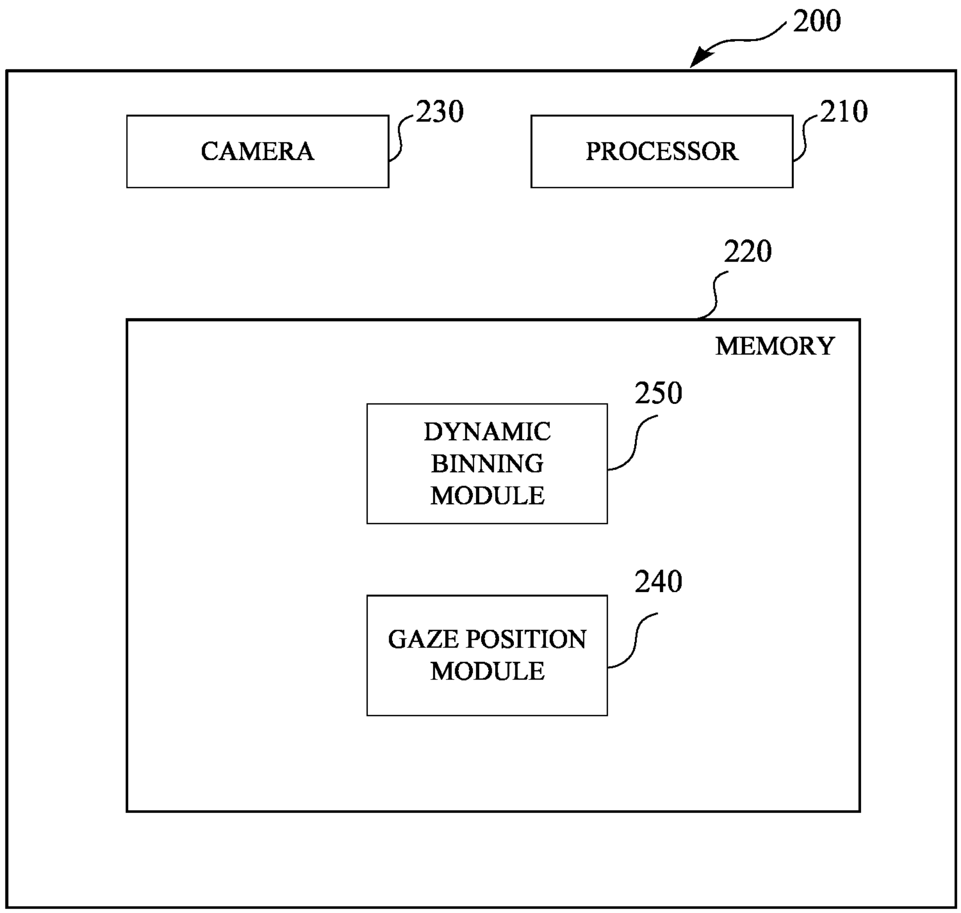
FIG. 2 is a block diagram illustrating components of an electronic device in accordance with one or more implementations of the subject technology.

FIG. 2 is a block diagram illustrating components of an electronic device in accordance with one or more implementations of the subject technology. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

In the example depicted in FIG. 2, electronic device 200 includes processor 210, memory 220, and camera 230. While not depicted in FIG. 2, electronic device 200 also may include the other components described above with respect to FIG. 1 in addition to the camera. Processor 210 may include suitable logic, circuitry, and/or code that enable processing data and/or controlling operations of electronic device 200. In this regard, processor 210 may be enabled to provide control signals to various other components of electronic device 200. Processor 210 may also control transfers of data between various components of electronic device 200. Additionally, the processor 210 may enable implementation of an operating system or otherwise execute code to manage operations of electronic device 200.

Processor 210 or one or more portions thereof, may be implemented in software (e.g., instructions, subroutines, code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Memory 220 may include suitable logic, circuitry, and/or code that enable storage of various types of information such as received data, generated data, code, and/or configuration information. Memory 220 may include, for example, random access memory (RAM), read-only memory (ROM), flash memory, and/or magnetic storage. As depicted in FIG. 2, memory 220 contains gaze position module 240 and dynamic binning module 250. The subject technology is not limited to these components both in number and type, and may be implemented using more components or fewer components than are depicted in FIG. 2.

According to aspects of the subject technology, gaze position module 240 comprises a computer program having one or more sequences of instructions or code together with associated data and settings. Upon executing the instructions or code, one or more processes are initiated to determine a gaze position of a user within a frame of mixed-reality content being presented to the user. Gaze position module 240 may use the output of one or more sensors directed towards the user's eyes to determine where within the frame of the mixed-reality content the user's gaze is focused. The gaze position determined by gaze position module 240 may be provided to rendering engine 150 to be used in rendering the virtual content. For example, the gaze position may be used for dynamic foveation where the portions of the virtual content closest to the gaze position are rendered at the highest resolution available while the portions of the virtual content as you move away from the gaze position are rendered at lower resolutions.

According to aspects of the subject technology, dynamic binning module 250 comprises a computer program having one or more sequences of instructions or code together with associated data and settings. Upon executing the instructions or code, one or more processes are initiated to dynamically set a binning mode of camera 230 based on the gaze position determined by gaze position module 240. Camera 230 may configurable to operate in a number of different binning modes. In a binning mode, the signals of multiple pixels within the sensor array used by camera 230 are combined. Binning improves the signal-to-noise ratio but also reduces the resolution of the captured image by ½, ¼, ⅛, etc. depending on how many pixels are combined in the binning mode. Reducing the resolution reduces the amount of image data that must be processed and stored in the pipeline between the camera and the display panel and thereby reduces the amount of power expended.

Dynamic binning module 250 uses the determined gaze position of the user relative to the mixed-reality content displayed in a frame to set a binning mode for camera 230. For example, if the gaze position of the user is on the rendered virtual content within the image frame, the resolution of the passthrough content captured by camera 230 surrounding the virtual content can be reduced with little to no impact on the user's experience with the mixed-reality environment. Accordingly, when the gaze position is determined to be on the rendered content, dynamic binning module 250 may set the binning mode for camera 230 to generate image data at a lower resolution. In addition to camera 230, ISP pipe 120, blending module 130, and display pipe 160 depicted in FIG. 1 also may be configured for the different resolution of the image data coming from camera 230.

Dynamic binning module 250 may rely on more than just the determination that the determined gaze position is on the rendered virtual content when deciding how to set the binning mode for camera 230 or select from multiple different binning modes, and therefore resolutions, of camera 230. For example, dynamic binning module 250 may consider the relative size of the rendered virtual content within the image frame to decide on setting a binning mode for camera 230. If the size of the rendered virtual content is relatively small, and therefore only occupies a small percentage of the image frame, the amount of passthrough content visible in the image frame may be distracting to the user's experience if the resolution of that passthrough content is reduced. Accordingly, thresholding may be used to determine whether to set a binning mode or select from multiple binning modes. For example, the rendered virtual content may need to comprise at least 50%, 60%, 70%, etc. of the image frame before the resolution of the passthrough data captured by camera 230 is reduced. Higher percentages of a frame being occupied with virtual content may allow lower resolutions to be selected for the captured passthrough content without distracting the user from the mixed-reality experience.

Dynamic binning module 250 also may consider the location of the rendered virtual content within the frame when setting a binning mode for camera 230. For example, if the rendered virtual content is located on the periphery of the image frame rather than in the center of the image frame, the resolution for the captured passthrough content may not be reduced or a binning mode with the least amount of resolution reduction may be selected and set by dynamic binning module 250. This consideration may be used in combination with the relative size consideration discussed above. In this combination, a larger percentage of the image frame may need to be occupied by the rendered virtual content before reducing the resolution of the captured passthrough content by setting a binning mode if the rendered virtual content is located on the periphery of the image frame. Correspondingly, if the rendered virtual content is located in the center of the image frame, a smaller percentage of the image frame may need to be occupied by the virtual content before setting the binning mode to reduce the resolution of the captured passthrough content.

The rendered virtual content may have an alpha value indicating a transparency of the virtual content. The more transparent the virtual content is within the image frame, the more the passthrough content will be visible through the virtual content. As the passthrough content becomes more visible, changes in the resolution of the passthrough content are more likely to be noticed by a viewing user and may distract from a mixed-reality experience. Dynamic binning module 250 may consider the alpha value of the rendered virtual content when setting a binning mode for camera 230. For example, a threshold alpha value indicating transparency of the rendered virtual content may be set and the resolution of the captured passthrough content may not be reduced using a binning mode for camera 230 if the threshold is satisfied.

The foregoing examples have described using different aspects of the rendered virtual content when dynamic binning module 250 is setting a binning mode for camera 230. Dynamic binning module 250 also may take into account aspects of the passthrough content when setting the binning mode for camera 230. For example, a contrast level of the captured passthrough content may be determined for an image frame. The contrast level may represent the difference in brightness or luminance between the darkest portions of the content in the image frame and the brightest portions of that content. The higher the contrast level of the captured passthrough content, the more likely a user will notice a reduction in resolution of the passthrough content in the mixed-reality experience. A contrast level threshold may be set and the resolution of the passthrough content may not be reduced using a binning mode for camera 230 if the threshold is satisfied.

In configurations where mixed-reality content is generated and displayed for each of a user's eyes, the subject technology may take advantage of stereo resolution multiplexing to reduce the resolution of the captured passthrough content being presented to one eye while leaving the resolution of the captured passthrough content unchanged for the other eye. In this scenario, the brain of the user may be able to compensate for the different resolutions making the different resolutions unnoticeable to the viewing user.

Figure 3:
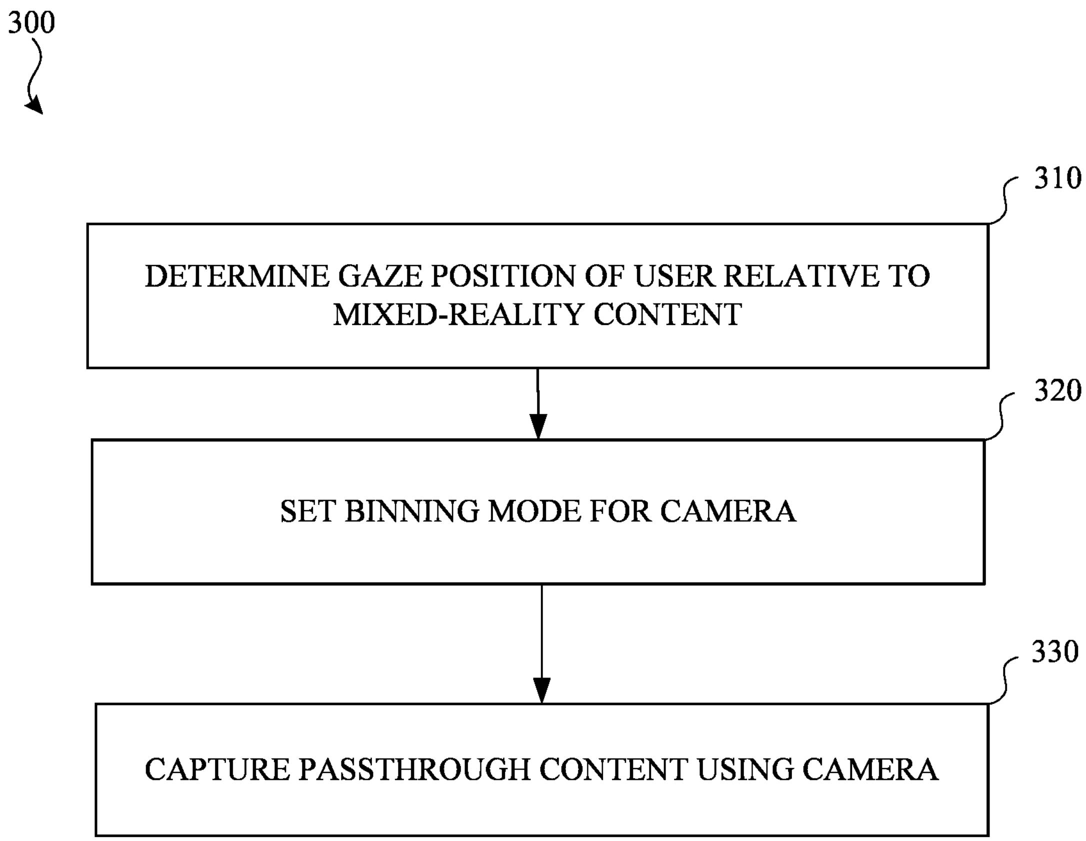
FIG. 3 illustrates an example process for setting a binning mode for a camera capturing passthrough content according to aspects of the subject technology.

FIG. 3 illustrates an example process for setting a binning mode for a camera capturing passthrough content according to aspects of the subject technology. For explanatory purposes, the blocks of process 300 are described herein as occurring in serial, or linearly. However, multiple blocks of process 300 may occur in parallel. In addition, the blocks of process 300 need not be performed in the order shown and/or one or more blocks of process 300 need not be performed and/or can be replaced by other operations.

Example process 300 includes determining a gaze position of a user relative to mixed-reality content being displayed to the user in a first frame (block 310). The mixed-reality content includes rendered virtual content blended with passthrough content. A binning mode for a first camera is set based on the determined gaze position (block 320). As noted above, the set binning mode may be based on a size of the rendered virtual content within the first frame, and/or the location of the rendered virtual content within the first frame and/or relative to the determined gaze position. Setting the binning mode also may be based on a transparency of the rendered virtual content and/or a contrast level of the passthrough content blended with the rendered virtual content. Passthrough content for a second frame is captured using the first camera at a resolution determined by the set binning mode (block 330). The resolution of the passthrough content captured for the second frame may be lower than the resolution of the passthrough content presented in the first frame and virtual content rendered for the second frame.

Figure 4:
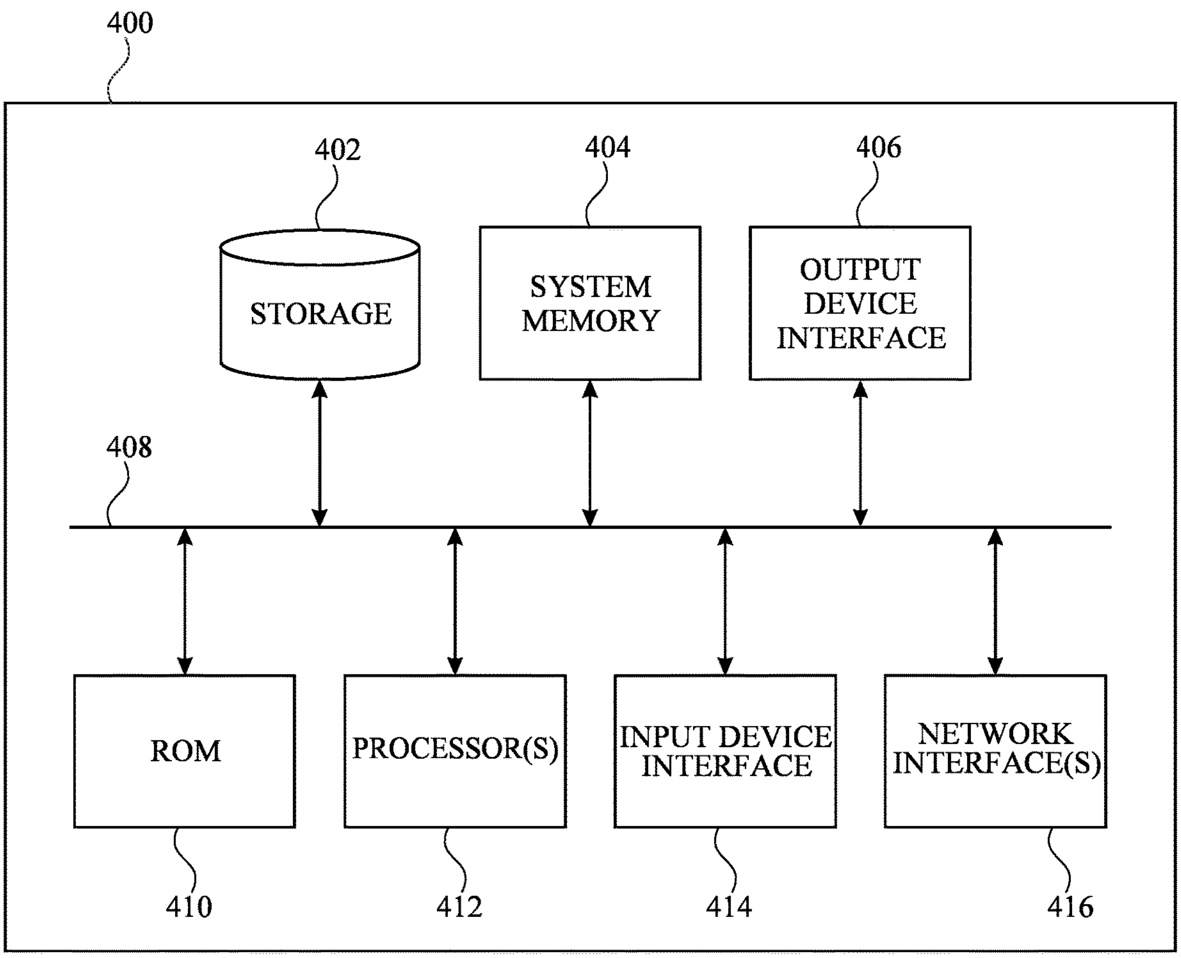
FIG. 4 illustrates an electronic system 400 with which one or more implementations of the subject technology may be implemented.

FIG. 4 illustrates an electronic system 400 with which one or more implementations of the subject technology may be implemented. Electronic system 400 can be, and/or can be a part of, electronic device 200 shown in FIG. 2. The electronic system 400 may include various types of computer readable media and interfaces for various other types of computer readable media. The electronic system 400 includes a bus 408, one or more processing unit(s) 412, a system memory 404 (and/or buffer), a ROM 410, a permanent storage device 402, an input device interface 414, an output device interface 406, and one or more network interfaces 416, or subsets and variations thereof.

The bus 408 collectively represents all system, peripheral, and chipset buses that communicatively connect the numerous internal devices of the electronic system 400. In one or more implementations, the bus 408 communicatively connects the one or more processing unit(s) 412 with the ROM 410, the system memory 404, and the permanent storage device 402. From these various memory units, the one or more processing unit(s) 412 retrieves instructions to execute and data to process in order to execute the processes of the subject disclosure. The one or more processing unit(s) 412 can be a single processor or a multi-core processor in different implementations.

The ROM 410 stores static data and instructions that are needed by the one or more processing unit(s) 412 and other modules of the electronic system 400. The permanent storage device 402, on the other hand, may be a read-and-write memory device. The permanent storage device 402 may be a non-volatile memory unit that stores instructions and data even when the electronic system 400 is off. In one or more implementations, a mass-storage device (such as a magnetic or optical disk and its corresponding disk drive) may be used as the permanent storage device 402.

In one or more implementations, a removable storage device (such as a floppy disk, flash drive, and its corresponding disk drive) may be used as the permanent storage device 402. Like the permanent storage device 402, the system memory 404 may be a read-and-write memory device. However, unlike the permanent storage device 402, the system memory 404 may be a volatile read-and-write memory, such as random access memory. The system memory 404 may store any of the instructions and data that one or more processing unit(s) 412 may need at runtime. In one or more implementations, the processes of the subject disclosure are stored in the system memory 404, the permanent storage device 402, and/or the ROM 410. From these various memory units, the one or more processing unit(s) 412 retrieves instructions to execute and data to process in order to execute the processes of one or more implementations.

The bus 408 also connects to the input and output device interfaces 414 and 406. The input device interface 414 enables a user to communicate information and select commands to the electronic system 400. Input devices that may be used with the input device interface 414 may include, for example, alphanumeric keyboards and pointing devices (also called "cursor control devices"). The output device interface 406 may enable, for example, the display of images generated by electronic system 400. Output devices that may be used with the output device interface 406 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 4, the bus 408 also couples the electronic system 400 to one or more networks and/or to one or more network nodes through the one or more network interface(s) 416. In this manner, the electronic system 400 can be a part of a network of computers (such as a LAN, a wide area network ("WAN"), or an Intranet, or a network of networks, such as the Internet. Any or all components of the electronic system 400 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

A head-mountable device can be worn by a user to display visual information within the field of view of the user. The head-mountable device can be used as a virtual reality (VR) system, an augmented reality (AR) system, and/or a mixed-reality (MR) system. A user may observe outputs provided by the head-mountable device, such as visual information provided on a display. The display can optionally allow a user to observe an environment outside of the head-mountable device. Other outputs provided by the head-mountable device can include speaker output and/or haptic feedback. A user may further interact with the head-mountable device by providing inputs for processing by one or more components of the head-mountable device. For example, the user can provide tactile inputs, voice commands, and other inputs while the device is mounted to the user's head.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations, (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In accordance with the subject disclosure, a method is provided that includes determining a gaze position of a user relative to mixed-reality content displayed in a first frame, setting a binning mode for a first camera based on the determined gaze position, and capturing, using the first camera, passthrough content for a second frame at a resolution determined by the binning mode.

The mixed-reality content displayed in the first frame may comprise rendered virtual content, and wherein the gaze position of the user is determined relative to the rendered virtual content. The binning mode for the first camera may be set based on a size of the rendered virtual content in the first frame. The binning mode for the first camera may be set based on a location of the rendered virtual content within the first frame.

The method may further include determining a transparency value for the rendered virtual content, wherein the binning mode for the first camera is set based on the determined transparency value. The method may further include determining a contrast level of passthrough content displayed in the first frame, wherein the binning mode for the first camera is set based on the determined contrast level. The method may further include rendering virtual content for the second frame, wherein a resolution of the virtual content rendered for the second frame is greater than the resolution of the passthrough content for the second frame. The virtual content for the second frame may be rendered using gaze-based foveation.

The method of may further include setting a binning mode for a second camera based on the determined gaze position, wherein the binning mode for the second camera is different from the binning mode for the first camera. The method may further include capturing, using the second camera, passthrough content for the second frame at a resolution determined by the binning mode for the second camera, wherein the passthrough content captured by the first camera is for display to a first eye of the user and the passthrough content captured by the second camera for display to a second eye of the user.

In accordance with the subject disclosure, a non-transitory computer-readable medium storing instructions is provided which, when executed by one or more processors, cause the one or more processors to perform operations. The operations include determining a gaze position of a user relative to rendered virtual content of mixed-reality content displayed in a first frame, setting a binning mode for a first camera based on the determined gaze position, and capturing, using the first camera, passthrough content for a second frame at a resolution determined by the binning mode.

The binning mode for the first camera may be set based on a size of the rendered virtual content in the first frame. The binning mode for the first camera may be set based on a location of the rendered virtual content within the first frame. The operations may further include determining a transparency value for the rendered virtual content, wherein the binning mode for the first camera is set based on the determined transparency value. The operations may further include determining a contrast level of passthrough content displayed in the first frame, wherein the binning mode for the first camera is set based on the determined contrast level.

The operations may further include setting a binning mode for a second camera based on the determined gaze position, and capturing, using the second camera, passthrough content for the second frame at a resolution determined by the binning mode for the second camera. The binning mode for the second camera may be different from the binning mode for the first camera, and wherein the passthrough content captured by the first camera is for display to a first eye of the user and the passthrough content captured by the second camera for display to a second eye of the user.

In accordance with the subject disclosure, a device is provided that includes a camera, a memory storing a plurality of computer programs, and one or more processors configured to execute instructions of the plurality of computer programs. When executed, the instructions determine a gaze position of a user relative rendered virtual content of mixed-reality content displayed in a first frame, set a binning mode for a first camera based on the determined gaze position relative to the rendered virtual content, and capture, using the first camera, passthrough content for a second frame at a resolution determined by the binning mode.

The binning mode for the first camera may be set based on a size of the rendered virtual content in the first frame. The binning mode for the first camera may be set based on a location of the rendered virtual content within the first frame. The one or more processors may be configured to execute the instructions to further render virtual content for the second frame, wherein a resolution of the virtual content rendered for the second frame is greater than the resolution of the passthrough content for the second frame.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:

determining a gaze position of a user relative to mixed-reality content displayed in a first frame, wherein the mixed-reality content displayed in the first frame comprises rendered virtual content, and wherein the gaze position of the user is determined relative to the rendered virtual content; and in response to determining that the gaze position lies within a region of the first frame occupied by the rendered virtual content:

setting a binning mode for a first camera based on the determined gaze position; and capturing, using the first camera, passthrough content for a second frame at a resolution determined by the binning mode.

2. The method of claim 1, wherein the binning mode for the first camera is set based on a size of the rendered virtual content in the first frame.

3. The method of claim 1, wherein the binning mode for the first camera is set based on a location of the rendered virtual content within the first frame.

4. The method of claim 1, further comprising:

determining a transparency value for the rendered virtual content, wherein the binning mode for the first camera is set based on the determined transparency value.

5. The method of claim 1, further comprising:

determining a contrast level of passthrough content displayed in the first frame, wherein the binning mode for the first camera is set based on the determined contrast level.

6. The method of claim 1 further comprising:

rendering virtual content for the second frame using gaze-based foveation, wherein a resolution of the virtual content rendered for the second frame is greater than the resolution of the passthrough content for the second frame.

7. The method of claim 1, further comprising:

setting a binning mode for a second camera based on the determined gaze position, wherein the binning mode for the second camera is different from the binning mode for the first camera.

8. The method of claim 7, further comprising:

capturing, using the second camera, passthrough content for the second frame at a resolution determined by the binning mode for the second camera, wherein the passthrough content captured by the first camera is for display to a first eye of the user and the passthrough content captured by the second camera for display to a second eye of the user.

9. The method of claim 1, wherein setting the binning mode for the first camera based on the determined gaze position further comprises:

selecting the binning mode from multiple different binning modes that the first camera is configurable to operate in; and configuring the first camera to operate in the selected binning mode.

10. A non-transitory computer-readable medium storing instructions which, when executed by one or more processors, cause the one or more processors to perform operations comprising:

determining a gaze position of a user relative to mixed-reality content displayed in a first frame;

determining a contrast level of passthrough content displayed in the first frame, setting a binning mode for a first camera based on the determined gaze position and the determined contrast level; and capturing, using the first camera, passthrough content for a second frame at a resolution determined by the binning mode.

11. The non-transitory computer-readable medium of claim 10, wherein the mixed-reality content displayed in the first frame comprises rendered virtual content, and wherein the gaze position of the user is determined relative to the rendered virtual content.

12. The non-transitory computer-readable medium of claim 11, wherein the binning mode for the first camera is set based on a size of the rendered virtual content in the first frame.

13. The non-transitory computer-readable medium of claim 11, wherein the binning mode for the first camera is set based on a location of the rendered virtual content within the first frame.

14. The non-transitory computer-readable medium of claim 11, wherein the operations further comprise:

determining a transparency value for the rendered virtual content, wherein the binning mode for the first camera is set based on the determined transparency value.

15. The non-transitory computer-readable medium of claim 10, wherein the operations further comprise:

setting a binning mode for a second camera based on the determined gaze position; and capturing, using the second camera, passthrough content for the second frame at a resolution determined by the binning mode for the second camera, wherein the binning mode for the second camera is different from the binning mode for the first camera, and wherein the passthrough content captured by the first camera is for display to a first eye of the user and the passthrough content captured by the second camera for display to a second eye of the user.

16. An electronic device, comprising:

a memory storing one or more computer programs; and one or more processors configured to execute instructions of the one or more computer programs to:

determine a gaze position of a user relative to mixed-reality content displayed in a first frame;

set a first binning mode for a first camera based on the determined gaze position;

set a second binning mode for a second camera based on the determined gaze position, wherein the second binning mode for the second camera is different from the first binning mode for the first camera;

capture, using the first camera, first passthrough content for a second frame at a first resolution determined by the first binning mode; and capture, using the second camera, second passthrough content for a third frame at a second resolution determined by the second binning mode.

17. The electronic device of claim 16, wherein the mixed-reality content displayed in the first frame comprises rendered virtual content, the gaze position of the user is determined relative to the rendered virtual content, and the first binning mode for the first camera is set based on a size of the rendered virtual content in the first frame.

18. The electronic device of claim 16, wherein the mixed-reality content displayed in the first frame comprises rendered virtual content, the gaze position of the user is determined relative to the rendered virtual content, and the first binning mode for the first camera is set based on a location of the rendered virtual content within the first frame.

19. The electronic device of claim 16, wherein the one or more processors are configured to execute the instructions to further:

render virtual content for the second frame, wherein a resolution of the virtual content rendered for the second frame is greater than the resolution of the first passthrough content for the second frame.

20. The electronic device of claim 16, wherein, in the first binning mode, first signals of a first number of pixels within a first sensor array used by the first camera are combined and, in the second binning mode, second signals of a second number of pixels within a second sensor array used by the second camera are combined, the first number of pixels being different than the second number of pixels.

* * * * *